United States Patent [19]
Tomforde et al.

[11] Patent Number: 5,688,021
[45] Date of Patent: Nov. 18, 1997

[54] BODY FOR A MOTOR CAR, ESPECIALLY A SMALL CAR

[75] Inventors: Johann Tomforde; Werner Nowak, both of Sindelfingen; Jens Manske, Weil der Stadt; Walter Berlinger, Sindelfingen, all of Germany

[73] Assignee: Micro Compact Car GmbH, Germany

[21] Appl. No.: 586,459

[22] Filed: Jan. 11, 1996

[30] Foreign Application Priority Data

Jan. 6, 1995 [DE] Germany .................. 195 00 361.6

[51] Int. Cl.⁶ .................................................. B60R 27/00
[52] U.S. Cl. .................. 296/185; 296/191; 296/197; 296/203; 296/196
[58] Field of Search .............................. 296/185, 187, 296/191, 197, 196, 203

[56] References Cited

U.S. PATENT DOCUMENTS

| | | | |
|---|---|---|---|
| 3,697,124 | 10/1972 | Wessell | 296/185 |
| 3,971,588 | 7/1976 | Bauer | 296/185 |
| 5,044,688 | 9/1991 | Jacobson | 296/191 |
| 5,129,700 | 7/1992 | Trevisan et al. | 296/197 |
| 5,213,386 | 5/1993 | Janotik et al. | 296/203 |
| 5,358,304 | 10/1994 | Kanemitsu et al. | 296/197 |

FOREIGN PATENT DOCUMENTS

| | | |
|---|---|---|
| 0 039 071 | 11/1981 | European Pat. Off. . |
| 0076934A1 | 4/1983 | European Pat. Off. . |
| 0233670A3 | 8/1987 | European Pat. Off. . |
| 0340180B1 | 11/1989 | European Pat. Off. . |
| 0501226A1 | 9/1992 | European Pat. Off. . |
| 0547583A1 | 6/1993 | European Pat. Off. . |
| 2684950 | 6/1993 | France . |
| 1142115 | 1/1963 | Germany . |
| 2336213C2 | 2/1975 | Germany . |
| 2414157 | 10/1975 | Germany . |
| 3008840C2 | 12/1980 | Germany . |
| 3119666 | 1/1982 | Germany ............... 296/203 |
| 3119666A1 | 1/1982 | Germany . |
| 3236751A1 | 4/1984 | Germany . |
| 3425776C1 | 1/1986 | Germany . |

(List continued on next page.)

OTHER PUBLICATIONS

372 Automotive Engineering, vol. 90 (1982), Febr. No. 2, Dallas, Texas USA, "Hybrid Car Has Bolt–On Body Elements", pp. 95–97.

l'auto–journal, Sep 1, 1982, Numero Double, 14 ET 15–1982, Paris, FR S.116.

*Primary Examiner*—Gary C. Hoge
*Attorney, Agent, or Firm*—Evenson, McKeown, Edwards & Lenahan P.L.L.C.

[57] ABSTRACT

The invention relates to a body for a motor car, especially a small car, in which the load-bearing structure of the body is formed by what is referred to as a "space-frame" structure. In the floor region and in the side region behind the doors, surface elements are integrated in a sealing and permanent manner into the framework structure and are in part closed off by window panes inserted in a sealing manner or by a roof inserted in a sealing manner. At the front, the body is closed off by a nose module which can be bolted on in a sealing manner, can be preassembled ready for operation and can be closed off laterally and at the rear by a side door fitted in a sealing manner and a tailgate, respectively. The outward-facing flat sides of the sections of the framework structure which lie above the beltline are exposed and in this region the bars are in each case shaped to match the desired surface profile of the body and—apart from a paint finish—directly form the body exterior surface area. Below the beltline, the framework structure is covered with panelling components which are connected removably to the framework structure, do not have a load-bearing function and, together with the lower portions of the doors and of the tailgate and with the nose module, determine the shape of the body in this lower region. The vehicle produced in this way is not only very easy to repair overall as minor damage to simple manner alternatives to the body but it is for dimensional be produced and made regards relatively also possible in a and formal body available.

19 Claims, 2 Drawing Sheets

FOREIGN PATENT DOCUMENTS

| | | | |
|---|---|---|---|
| 3429880 | 2/1986 | Germany | 296/197 |
| 3705986A1 | 9/1987 | Germany . | |
| 3608506C2 | 11/1987 | Germany . | |
| 4409466 A1 | 10/1994 | Germany | 296/203 |
| 61-120668 | 7/1986 | Japan . | |
| 63-227478 | 9/1988 | Japan . | |
| 314676 | 12/1989 | Japan | 296/197 |
| 1632856 A | 3/1991 | U.S.S.R. | 296/185 |
| 2067480 | 7/1981 | United Kingdom | 296/197 |

BODY FOR A MOTOR CAR, ESPECIALLY A SMALL CAR

BACKGROUND AND SUMMARY OF THE INVENTION

The invention relates to a body for a motor car, especially a small car.

In the case of a motor car, the outer-skin components are generally integrated permanently into the load-bearing frame structure of the body and, as a result, it is not possible to change the dimensions or shape of the outer skin without also fundamentally changing the frame structure. Publications in this area are concerned, in particular, with the configuration of the frame structure and do not give a detailed account of how and where outer skin components are connected to the frame structure. Mention may be made in this context of German Patent Documents DE 31 19 666 A1, DE 30 08 840 C2 and DE 23 36 213 C2, for example. Although it is not explicitly mentioned there, it may be assumed of the prior art cited that the outer skin components of the body are largely a fixed and integral and, above all, load-bearing pare of the frame structure.

German Patent Document DE 34 25 776 C2 shows a vehicle door in which the exterior of the door is divided horizontally into two parts which are both removably connected to the load bearing frame of the vehicle door. This type of door configuration has been chosen with a view to easier replacement of the outer parts in case there is a need for repair.

In the case of the vehicle door in accordance with German Patent Document DE 36 08 506 C2, the door outer leaf is likewise removably connected to the load-bearing structure of the vehicle door, although for a different reason. The intention of this arrangement is to allow the external door leaf to be adjusted into the corresponding body cut-out for the vehicle door in such a way that it is flush with the surface and equidistant at the edges, irrespective of any misalignment in the load-bearing structure of the vehicle door. This arrangement requires a relatively complex, adjustable means of mounting the external door leaf on the load bearing structure of the door.

Taking the prior art discussed as a starting point, it is an object of the invention to specify a design for a car body such that a vehicle produced is very easy to repair overall as regards relatively minor damage to the body and also facilitates dimensional and formal body alternatives to be produced in a simple and economical manner.

According to the invention this object is achieved by providing a car body for a motor car which includes load bearing, structural bar members connected together to form a "space frame" structure and removably attachable body panel parts connected to the load bearing structural bar members, wherein portions of said load bearing structural bar members, especially above the vehicle beltline, form exterior facing surfaces of the car body, and portions of said structural bar members, especially below the beltline, are covered by the removably attachable body panel parts.

According to certain preferred embodiments there is provided a car body, especially a small car, in which the load-bearing structure of the body is formed by a three-dimensional framework structure composed of sectional framework bars joined together by way of connecting nodes to form a "space-frame" structure, wherein the areas between the framework bars in a floor region and in a side region behind vehicle side doors are closed off by surface elements permanently integrated into the framework structure and connected in a sealing manner to the framework bars, wherein the open areas of the framework structure in a region of a windscreen and of fixed side windows behind the side doors and in a region of a roof are closed off respectively by window panes inserted in a sealing manner and by a roof inserted in a sealing manner, wherein open areas of the framework structure in the front region are closed off by a leaktight nose module which can be bolted on, can be preassembled ready for operation and, on the right and left, also contains front light units, the nose module being covered with a panelling component which leaves gaps for the front light units, wherein the open areas of the framework structure in the region of the side doors and of a tailgate can be closed off respectively by a side door fitted in a sealing manner and a tailgate, which vehicle doors and tailgate each have, respectively, an external door leaf and a gate outer wall limited to the region below the bottom edge or beltline of the windows, wherein at least regions of those sectional bars of the framework structure which lie above the bottom edge or vehicle beltline of the windows have respective outward-facing sides exposed and are in each case shaped in this region to match a desired surface profile of the body and—apart from a paint finish—directly form external body surface areas, wherein the panelling component which covers the nose module and leaves gaps for the front light units is connected removably and replaceably to the nose module, wherein the external door leaves and the gate outer wall belonging respectively to the vehicle doors and the tail gate and limited to the region below the beltline of the windows are likewise each connected removably and replaceably to the load-bearing door or gate structure, wherein the framework structure is covered below the beltline with panelling components without a load-bearing function which are connected removably and replaceably to the framework structure and, in this lower region, determine the shape of the body together with the external door leaves, the gate outer wall and the panelling component of the nose module.

According to advantageous features of preferred embodiments of the invention, the panelling components of the body, in particular those below the beltline, which essentially determine the appearance of the small car, are attached removably and in an easily replaceable manner to the vehicle or framework structure, whereas the sectional bars of the framework structure which extend above the beltline have their respective outward-facing flat sides exposed and, in this region, are each shaped to match the desired surface profile of the body; and apart from a paint finish, they directly form body surface area.

The advantages that can be achieved with the invention are as follows:

(i) In the case of trivial damage, the panelling components can be replaced or repaired very easily and quickly.
(ii) It is possible to replace the entire outer skin of the vehicle without a great outlay in terms of time and cost, not only as regards its color but also as regards its shape, and in this way to renew or update the appearance even of a used vehicle.
(iii) Even at the initial development stage of a vehicle, the final shape of the outer skin of the vehicle need only be determined at a very late point in time.
(iv) It is possible without great outlay in terms of cost to make available variant models as regards the outer skin for a basic model of a vehicle.
(v) It is possible to take account of customer wishes as regards a particular ordered vehicle even at a very late stage, just before the production of the vehicle concerned and, in extreme cases, even on the day of production.

(vi) The vehicle manufacturer can be very flexible in his response to the wishes of the market by repeatedly marketing a small test run of new body shapes for a mass-produced vehicle and awaiting market demand for it.

(vii) Even apart from considerations of ease of repair, the possibility of replacing the outer skin of the body in a relatively problem-free and economical manner may represent a benefit to the customer, at least for those customers who occasionally wish to have a different outer skin for their vehicle.

Other objects, advantages and novel features of the present invention will become apparent from the following detailed description of the invention when considered in conjunction with the accompanying drawings.

DETAILED DESCRIPTION OF THE DRAWINGS

Figure 1:
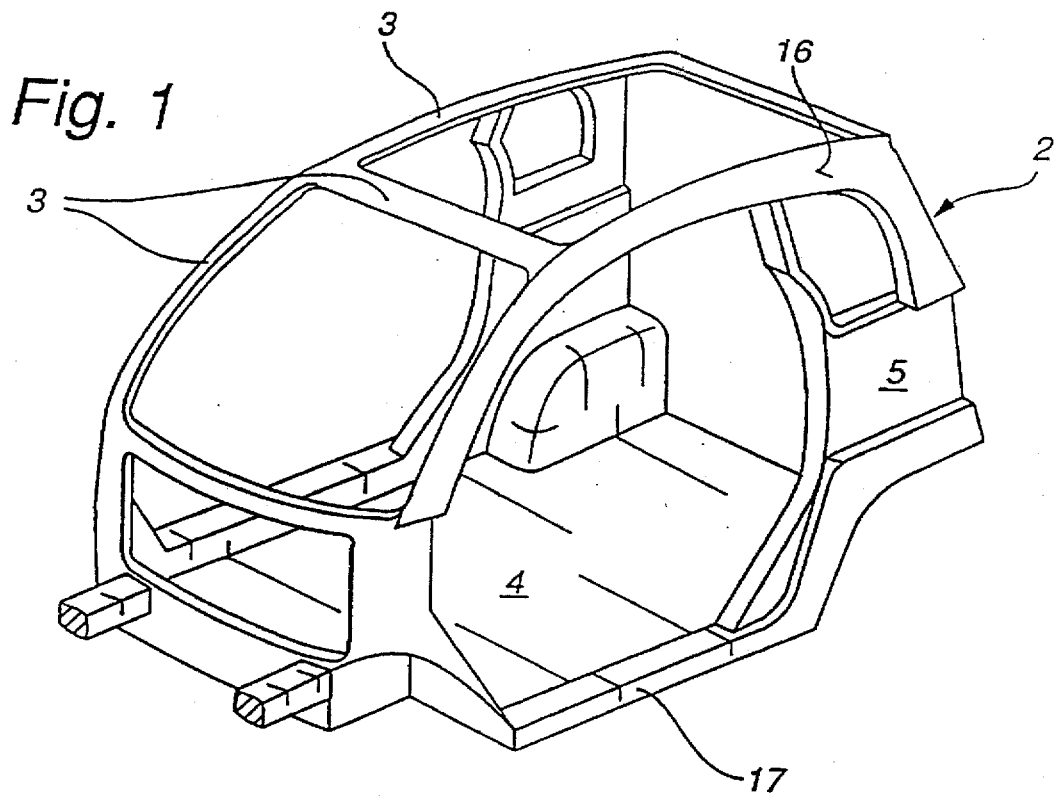
FIG. 1 shows a perspective representation of an isolated framework structure for a first exemplary embodiment of a small car constructed according to the present invention.
Figure 2:
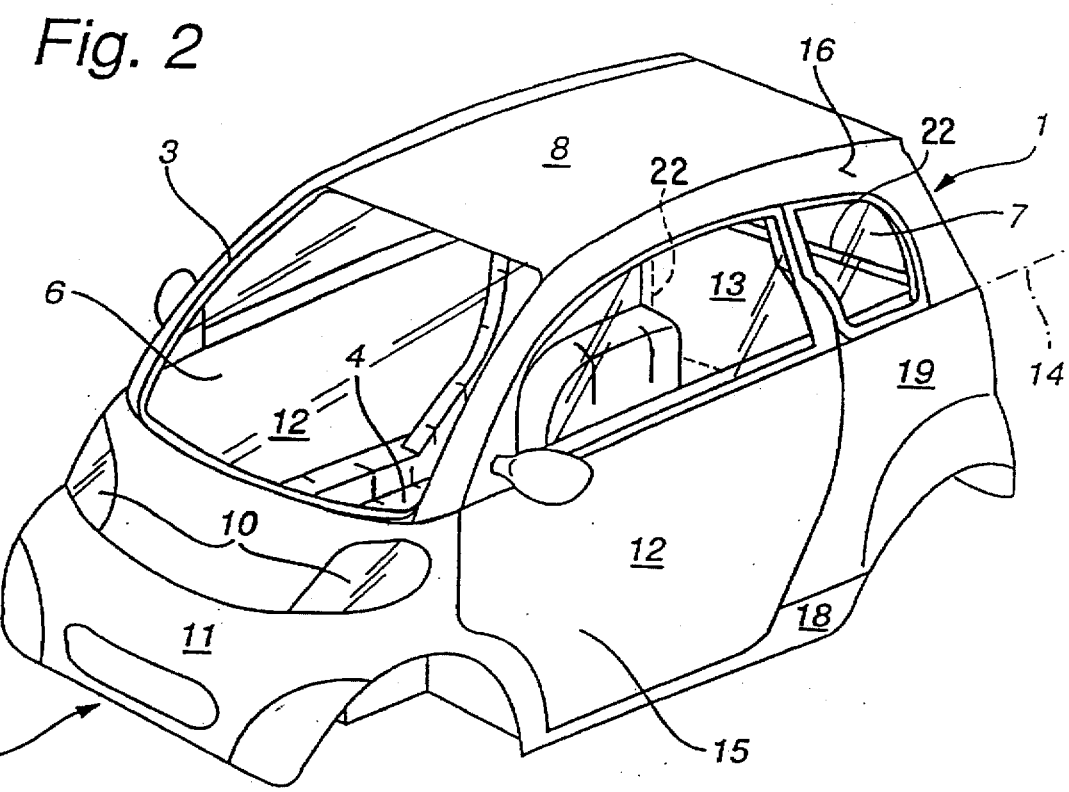
FIG. 2 shows a perspective representation of the complete small-car body fabricated from the framework structure of FIG. 1.

The body 1 shown in FIG. 2 is designed primarily for a small car. According to FIG. 1, the load-bearing structure of the body is in the form of a "space-frame" structure, i.e. it is formed by a three-dimensional framework structure 2 composed of sectional bars 3 (in the example shown in FIG. 3 from sectional bars 3, 20 and 21) which, for their part, are connected to one another by way of connecting nodes. The areas between the framework bars 3 are only partially covered, specifically in the floor region and in the side region behind the doors, by surface elements permanently integrated into the framework structure and connected in a sealing manner to the framework bars, namely by a floor 4 and by a right-hand and a left-hand side-wall part 5.

In the region of the windscreen or windshield 6 and of fixed side windows 7 behind the side doors 12, the open areas are closed off by window panes 6 and 7 inserted in a sealing manner. To this extent, the shape of the body and the appearance of the body are determined by the framework structure and susceptible of little variation once vehicle development has been completed and the production equipment has been chosen.

In the roof region too, at least as far as the shape of the roof is concerned, there is only a small amount of room for design variants, especially since it would seem that replacement would only be possible with a relatively large amount of effort in terms of installation work because of the hard roof 8 which is inserted in a sealing manner in the case of the exemplary embodiment shown in FIG. 2. Admittedly, minor damage is less likely here and the roof region has less of an effect on the appearance of a small car than, for instance, the side portions. However, from a functional point of view, depending on the customer's wishes, it is also readily possible to insert a different roof structure, e.g. a multi-panel roof or folding roof, in a sealing manner instead of the hard roof 8, which can incidentally consist of an opaque material, e.g. sheet metal, or of a transparent material, e.g. a plastic. The body design according to the invention is thus also variable as regards the roof and allows for changes to be requested even at a relatively late stage in the production of an individual customer's vehicle.

The open area of the framework structure in the front region is closed off by a nose module 9 which can be bolted on in a sealing manner, can be preassembled ready for operation and which, although it contains the front light units 10 on the right and left, does not contain any directly integrated panelling.

The outward-facing flat sides 16 of the sectional bars 3 of the framework structure 2 which lie above the bottom edge 14 of the window—referred to below as the "beltline"—are exposed, and in this region the bars are in each case shaped in accordance with the desired surface profile of the body 1 and apart from a paint finish—directly form the body exterior surface area.

In order not only to make the vehicle very easy to repair overall as regards relatively minor damage to the body but also to be able in a simple manner to produce and offer dimensional and formal body alternatives, the panelling components of the body below the beltline 14, which essentially determine the appearance of the small car, are attached removably and in an easily replaceable manner to the vehicle or framework structure.

To this end, the framework structure 2 is clad with panelling components 18, 19 without a load-bearing function below the beltline 14, these panelling components being connected removably and replaceably to the framework structure 2 and, together with the external door leaves 15, the tail gate outer wall 22 and the panelling component 11 of the nose module 9, determining the body shape in this lower area. The nose module too is clad with a panelling component 11, the said panelling component Leaving gaps for the front light units and being connected removably and replaceably to the nose module.

The laterally open areas for entry and exit and, at the rear, for Loading and unloading, can each be closed off in a conventional manner by a side door 12 fitted in a sealing manner or by a tailgate 13. The side doors and the tailgate each have a load-bearing door structure or gate structure in which the usual door or gate fittings are accommodated and preassembled ready for operation. In the case of the doors, such fittings may include the wind-up window, the lock system, and the internal door panelling. In the case of the tailgate, such fittings may include the rear window, a screen washer system where appropriate the number-plate lighting and the electrics for the rear lights. However, the said door and gate structures do not have a permanently integrated external door leaf 15 or gate outer wall. On the contrary, an external door leaf 15 and a gate outer wall belonging respectively to the vehicle doors and the tailgate and limited to the region below the lower edge 14 of the window are fitted subsequently in a removable and replaceable manner to the load-bearing door structure or gate structure prefitted together with other functional components.

The framework structure 2 is coated with a different paint finish from that of the panelling components, i.e. a paint finish which requires different application methods. Depending on the manner of coating chosen, these have the advantage, under certain circumstances, of low paint overspray and a high application rate in a single application step, thus making it possible to achieve low painting costs. In addition, novel optical effects for the framework can be achieved. Since—insofar as the surface areas of the framework structure are directly exposed in the finished vehicle—these surface areas are only relatively small and determine the appearance of the vehicle only to a small extent, paint finish which satisfies optically less demanding requirements can be accepted for the entire framework structure and for the internally and externally visible load-bearing structure of the side doors and the tailgate without the appearance of the vehicle suffering therefrom. In particular in—contrast to the paint finish of the panelling components 11, 15, 18, 19—a paint finish of a single color is permissible for the framework structure 2 for all the different vehicle color schemes. It is conceivable here to use just a small number of different ground shades. In contrast to the paint finish of the panelling components, the framework structure can be coated with a paint finish with a textured surface and/or specks of color. This paint finish is expediently given a coarser surface texture and/or specks of color than any surface defects and/or working marks on the unpainted sectional bars 3 of the framework structure 2, allowing the latter to be covered in an effective manner without pretreatment, apart from very gross exceptions, which have to be made good.

For the panelling components 11, 15, 18, 19 which essentially determine the appearance of the vehicle, a paint finish of an optically higher standard is provided. Given that the panelling components are installed only at a very late stage in a vehicle which is being constructed, these panelling components can be painted essentially in a horizontal flat position, this likewise simplifying, shortening (greater layer thickness per application step) and improving the application process ecologically (less overspray).

Frame parts which for certain reasons are exposed or are intended to be exposed but, for reasons connected with style, are nevertheless to be matched to the color of the car, can be covered with a removable cover. For example, the side sills 17, i.e. the longitudinal floor members extending below-the side doors 12, may remain exposed even when the side doors 12 are closed. In this case, they are covered with a non-load-bearing panelling component 18, the color of which is matched to that of the car and which is connected removably and replaceably to the respective side sill 17. It is also contemplated instead, however, under certain circumstances to leave the side sills 17 directly exposed when the vehicle doors 12 are closed and to leave component 19 directly exposed as well (cf. FIG. 3) and to leave them in the ground shade of the framework structure. In this case, it is advisable to shape the outward-facing surface of the sill to match the desired surface profile of the body 1, 3, 80 that—apart from the paint finish—they can form body surface areas directly.

Figure 3:
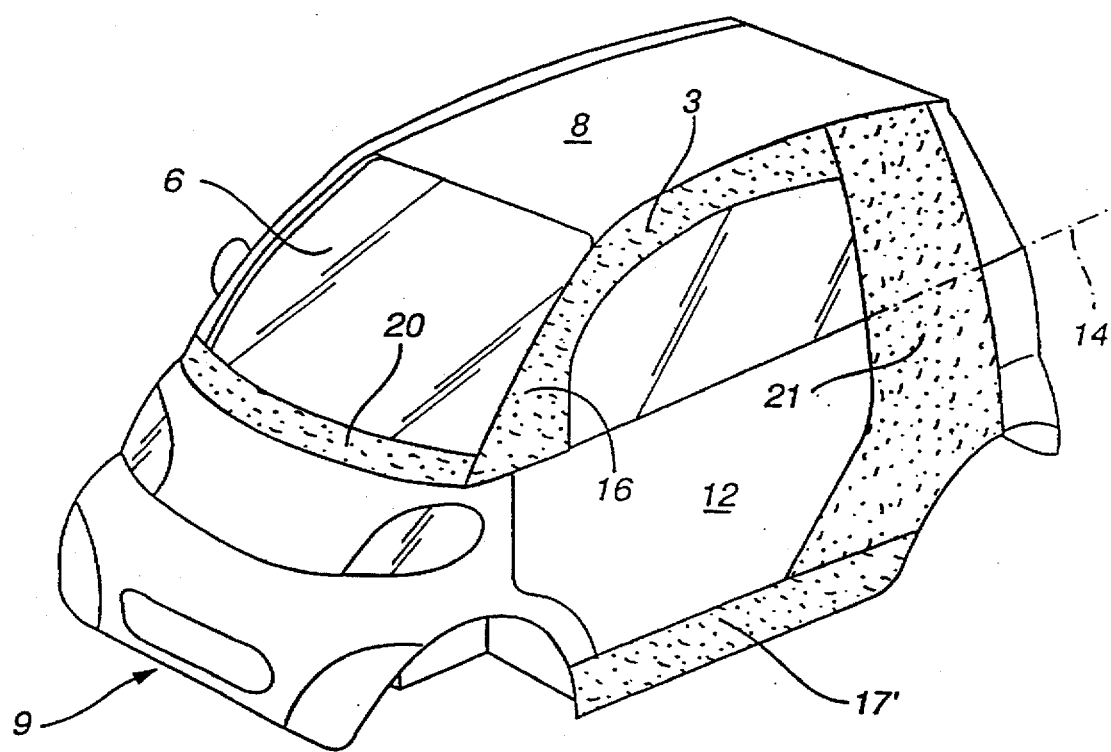
FIG. 3 shows a further exemplary embodiment of the body of a small car in which the amount of the outer skin that can be replaced is less than in the example shown in FIGS. 1 and 2.

In the exemplary embodiment shown in FIG. 3, of a small-car body, the replaceable areas of the bodywork—illustrated in white in FIG. 3—are smaller than in the example shown in FIGS. 1 and 2. This means at the same time that those parts of the framework structure of which the outward-facing flat side is exposed and, in this area, are each case shaped to match the desired surface profile of the body and directly form body surface areas are larger than in the case of the body shown in FIG. 2. These externally visible frame parts are shown speckled in FIG. 3. In addition to the roof-frame members, these visible frame parts are the sill 17' below the vehicle doors 12, the sectional bar 20 below the windscreen 6 and the wide, vertical sectional bar for the B pillar behind the side door. Although the B pillar forms visible body area over its entire vertical extent, it is Partially covered at least in the lower part, specifically in the rearward area, with a replaceable panel. In a contemplated variant, the region above the beltline 14 but behind the sectional bar 21 can be open and be closed off by a wrap round rear screen which extends into the side area. In another contemplated embodiment, it is also provided for the upper region of the B pillar to be closed off above the beltline, by giving the B pillar a greater width, and the same with a removably attached sheet-metal part.

The present invention also contemplates the method of making a small car body as disclosed herein. In preferred embodiments the non-load bearing panels are detachably connected to the load bearing structural parts by one of bolted connections and screw connections.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Body for a motor car comprising a load-bearing structure formed by a three-dimensional framework structure composed of sectional framework bars joined together by way of connecting nodes to form a "space-frame" structure, wherein areas between the framework bars in a floor region and in a side region behind vehicle side doors are closed off by surface elements permanently integrated into the framework structure and connected in a sealing manner to the framework bars, wherein open areas of the framework structure in a region of a windscreen and of fixed side windows behind the side doors and in a region of a roof are closed off respectively by window panes inserted in a sealing manner and by a roof inserted in a sealing manner, wherein the open areas of the framework structure in the front region are closed off by a leaktight nose module which contains front light units, wherein open areas of the framework structure in the region of the side doors and of a tailgate are closed off respectively by a side door fitted in a sealing manner and a tailgate, which vehicle doors and tailgate each have, respectively, an external door leaf and a gate outer wall limited to the region below the bottom edge or beltline of the windows, wherein at least regions of those sectional bars of the framework structure which lie above a bottom edge or vehicle beltline of the windows have respective outward-facing sides exposed and are shaped to match a desired surface profile of the body and directly form external body surface areas, wherein a panelling component which covers the nose module and leaves gaps for the front light units is connected removably and replaceably to the nose module, wherein the external door leaves and the gate outer wall of the vehicle doors and the tail gate and limited to the region below the beltline are each directly connected removably and replaceably to a load-bearing door structure and a load-bearing gate structure, respectively, and wherein the framework structure is covered below the beltline with panelling components without a load-bearing function which are directly connected to the framework structure in a removable and replaceable manner and which determine a shape of the body together with the external door leaves, the gate outer wall and the panelling component of the nose module.

2. Body according to claim 1, wherein the framework structure is coated with a paint finish which is different from the paint finish of the panelling components and requires different application methods.

3. Body according to claim 1, wherein the panelling components are painted with a paint finish selected from a group of a plurality of paint finishes, and the framework structure is painted with a paint finish selected from a single paint finish.

4. Body according to claim 1, wherein the framework structure is painted with a paint finish selected from a first group of paint finish shades and wherein the panelling components are painted with a paint finish selected from a second group of paint finish shades, said first group having a smaller number of shades than said second group.

5. Body according to claim 1, wherein in contrast to the paint finish of the panelling components, the framework structure is coated with an alternative paint finish.

6. Body according to claim 1, wherein in contrast to the paint finish of the panelling components, the framework structure is coated with a paint finish with a textured surface and/or speckled coloring.

7. Body according to claim 1, wherein the framework structure includes side sills in the form of longitudinal floor members extending below the side doors, which side sills are exposed even when the side doors are closed but are covered with a non-load-bearing panelling component, the color of which is matched to that of the car and which is connected removably and replaceably to the respective side sill.

8. Body according to claim 1, wherein the framework structure includes side sills in the form of longitudinal floor members extending below the side doors, which side sills are directly exposed even when the vehicle doors are closed, said side sills having their outward-facing surface shaped to match the desired surface profile of the body and, apart from a paint finish, directly form exterior body surface areas.

9. Passenger car body assembly for a small passenger car, comprising:
    a load bearing vehicle frame structure composed of interconnected sectional bars and a floor panel, said interconnected sectional bars forming:
        an upper front opening for a vehicle windshield,
        front lateral open areas at each lateral side for respective vehicle side doors which include side door windows extending above a vehicle beltline,
        rear lateral open areas at each lateral side for respective rear side windows extending above the vehicle beltline,
        and a rear open area for a rear door,
    a portion of said load bearing vehicle frame structure forming a portion of an exterior surface of the car;
    and non-load bearing exterior body parts detachably connected directly to the load bearing vehicle frame structure, said non-load bearing exterior body parts including:
        a nose module attached below said upper front opening,
        and vehicle exterior side panels attached to said load bearing frame structure and said side doors at areas thereof disposed below said vehicle beltline.

10. Passenger car body assembly according to claim 9, wherein a roof section is detachably connected to said sectional bars to close said open area in the region of the roof.

11. Passenger car body assembly according to claim 9, wherein said load bearing vehicle frame structure above said beltline includes substantially finished exterior surfaces coordinated to adjacent ones of said nonload hearing exterior body parts.

12. A method of making a small passenger car body comprising:
    forming a load bearing vehicle frame structure composed of interconnected sectional bars and a floor panel, said interconnected sectional bars forming:
        an upper front opening for a vehicle windshield,
        front lateral open areas at each lateral side for respective vehicle side doors which include side door windows extending above a vehicle beltline,
        rear lateral open areas at each lateral side for respective rear side windows extending above the vehicle beltline,
        and a rear open area for a rear door,
    a portion of said load bearing vehicle frame structure forming a portion of an exterior surface of the car;
    and subsequently detachably connecting non-load bearing exterior body parts directly to the load bearing vehicle frame structure, said non-load bearing exterior body parts including:
        a nose module attached below said upper front opening,
        and vehicle exterior side panels attached to said load bearing frame structure and said side doors at areas thereof disposed below said vehicle beltline.

13. A method according to claim 12, wherein said detachably connecting includes bolting said nose module to the load bearing vehicle frame structure.

14. A method according to claim 12, further comprising the steps of:
    removing at least one of the vehicle exterior side panels; and
    replacing said at least one of the vehicle exterior side panels with a vehicle exterior side panel having a different exterior configuration.

15. A method according to claim 14, wherein said replacing step comprises replacing said at least one of the vehicle exterior side panels with a different vehicle exterior side panel having a different exterior configuration.

16. Body for a motor vehicle, comprising:
    a load bearing vehicle frame structure composed of interconnected sectional bars, said interconnected sectional bars defining an upper front opening for a vehicle windshield, and front lateral open areas at each lateral side for respective vehicle side doors, a portion of said load bearing vehicle frame structure forming a portion of an exterior surface of the motor vehicle; and
    a plurality of non-load bearing exterior body panels detachably connected directly to the load bearing vehicle frame structure to form a portion of the exterior surface of the motor vehicle.

17. Body for a motor vehicle according to claim 16, wherein said non-load bearing exterior body panels include exterior body panels detachably attached to said side doors.

18. A method of making a body for a motor vehicle comprising the steps of:
    (a) forming a load bearing vehicle frame structure composed of interconnected sectional bars, said interconnected sectional bars defining an upper front opening for a vehicle windshield, and front lateral open areas at each lateral side for respective vehicle side doors, a portion of said load bearing vehicle frame structure forming a portion of an exterior surface of the motor vehicle; and
    (b) subsequently detachably connecting a plurality of non-load bearing exterior body panels directly to the load bearing vehicle frame structure to form a portion of the exterior surface of the motor vehicle.

19. Body for a motor vehicle according to claim 18, wherein step (b) includes detachably connecting exterior body panels to said side doors.

* * * * *